United States Patent [19]

Boss

[11] Patent Number: 5,137,231
[45] Date of Patent: Aug. 11, 1992

[54] DECOMPRESSION VENTING GRILLE FOR AIRCRAFT

[75] Inventor: William L. Boss, Seattle, Wash.
[73] Assignee: The Boeing Company, Seattle, Wash.
[21] Appl. No.: 692,844
[22] Filed: Apr. 29, 1991
[51] Int. Cl.[5] .............................................. B64D 13/00
[52] U.S. Cl. ...................................... 244/118.5; 52/1; 454/76
[58] Field of Search ................. 244/118.5, 117 R, 119, 244/121; 98/1.5, 2.18, 74, 77, 79, 95, 119; 52/1; 49/21, 31, 141; 180/68.1, 68.3

[56] References Cited

U.S. PATENT DOCUMENTS

| | | | |
|---|---|---|---|
| Re. 32,554 | 12/1987 | Murphy | 244/118.5 |
| 1,601,100 | 9/1926 | Baker et al. | 98/119 |
| 3,150,749 | 10/1964 | Robrecht et al. | 52/1 |
| 3,204,548 | 9/1965 | McCabe | 98/119 |
| 3,584,567 | 6/1971 | Roach | 98/119 |
| 4,276,725 | 7/1981 | Ash | 52/1 |
| 4,383,666 | 5/1983 | Allerding et al. | 244/118.5 |
| 4,390,152 | 6/1983 | Jorgensen | 244/118.5 |
| 4,432,514 | 2/1984 | Brandon | 244/118.5 |
| 4,576,088 | 3/1986 | Mathewes et al. | 49/31 |
| 4,703,908 | 11/1987 | Correge et al. | 244/118.5 |
| 4,829,885 | 5/1989 | McVicker | 98/119 |
| 4,899,960 | 2/1990 | Hararat-Tehrani et al. | 244/118.5 |

Primary Examiner—Joseph F. Peters, Jr.
Assistant Examiner—Anne E. Bidwell
Attorney, Agent, or Firm—R. H. Sproule; B. A. Donahue

[57] ABSTRACT

A grille for an aircraft mounted on the cabin sidewall includes apertures to allow return airflow from the air conditioning system. In a preferred embodiment, the grille apertures are covered by resilient baffles which are resiliently folded into semicircular configurations and held in place between adjacent ribs of the grille by the force exerted by the folded baffles. One end of each baffle is affixed to upper and lower rods of the grille, while an opposite end of each baffle is releasably inserted over the rods. During a sudden decompression of the cargo compartment, the releasable ends of the baffles are dislodged from the rods and unbend into a flat shape in a manner parallel to the airstream. This permits rapid pressure equalization between the cargo and passenger compartments. The tops and bottoms of the baffles when in the folded closed position are open thereby permitting sufficient airflow therethrough to achieve rapid pressure equalization in the event of reverse decompression when the passenger cabin is rapidly decompressed.

9 Claims, 4 Drawing Sheets 5,137,231

DECOMPRESSION VENTING GRILLE FOR AIRCRAFT

TECHNICAL FIELD

The present invention pertains to a vent grille for regulating the amount of recirculating airflow in an aircraft cabin and for allowing rapid equalization of pressure in the aircraft in the event of sudden decompression.

BACKGROUND OF THE INVENTION

A requirement exists for large commercial aircraft known as "widebodies" (such as the Boeing 767) to prevent collapse of the cabin floor during a rapid decompression situation. This is accomplished by providing a path for the rapid movement of air between aircraft cabin and the cargo compartment located below the cabin floor in the event of a rupture in the aircraft shell. In addition, there exists a requirement to provide a return air path within the environmental control system for conditioned air circulated within the aircraft cabin. To meet these requirements air grilles are installed in the passenger cabin which regulate the amount of return air flow from the cabin to the aircraft environmental control system. More specifically, the air grilles are adjusted to allow a precise amount of return airflow depending upon their location in the aircraft cabin. For example, some conventional grilles include louvers which are normally partially closed to regulate return airflow to the environmental control system but which are automatically deployed to a full open position by spring biasing during sudden decompression.

These conventional grilles are usually located in the cabin sidewall near the floor between the lower edge of each sidewall panel and the top of the floor. The amount of air flow allowed through the grilles is a function of their distance from the environmental control system recirculating air fan. In addition to providing a means of regulating airflow, the grilles must protect insulation as well as aircraft systems located behind the sidewall from damage due to cleaning equipment, under-seat passenger luggage and other passenger abuse. Furthermore, these grilles are required to block line-of-site noise transmission into the cabin as well as to function as decorative screens.

A problem with some conventional grilles are their complexity, weight, and cost. In addition, they can be difficult to repair when damaged as a result of passenger or cleaning personnel abuse.

A number of conventional air vent grilles have been disclosed. For example, U.S. Pat. No. 3,854,567 by Roach discloses an aircraft decompression panel which has a number of vertically spaced hinged louvers of airfoil design and which are caused to move to an open position during the presence of a sudden pressure differential. Furthermore, U.S. Pat. No. 4,432,514 by Brandon, and assigned to the assignee of the present invention, discloses a decompression panel having a number of openings for relieving a pressure differential between an aircraft cabin and a cargo compartment such that a valve is spring biased to cover the openings until a sudden pressure differential is present.

SUMMARY OF THE INVENTION

The present invention pertains to an air vent for an aircraft. The air vent includes a panel having at least one opening therein to permit airflow through the panel as well as a covering member for covering the opening. The covering member is supported on the panel. In response to a pressure differential across the air vent, the covering member is caused to move between a closed position wherein the covering member covers the opening and an open position wherein the covering member does not cover the opening.

BRIEF DESCRIPTION OF THE DRAWINGS

The present invention will be described more fully in the following Detailed Description in conjunction with the attached drawings, in which.

DETAILED DESCRIPTION

Figure 1:
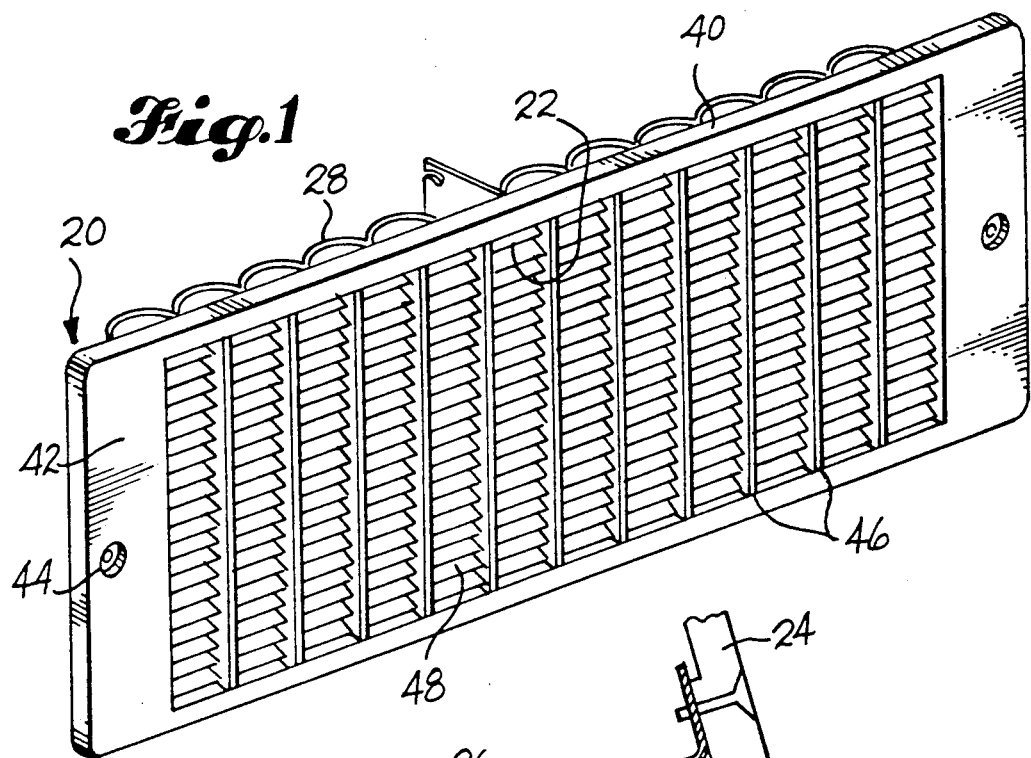
FIG. 1 is a front isometric view of a first exemplary vent grille of the present invention.
Figure 2:
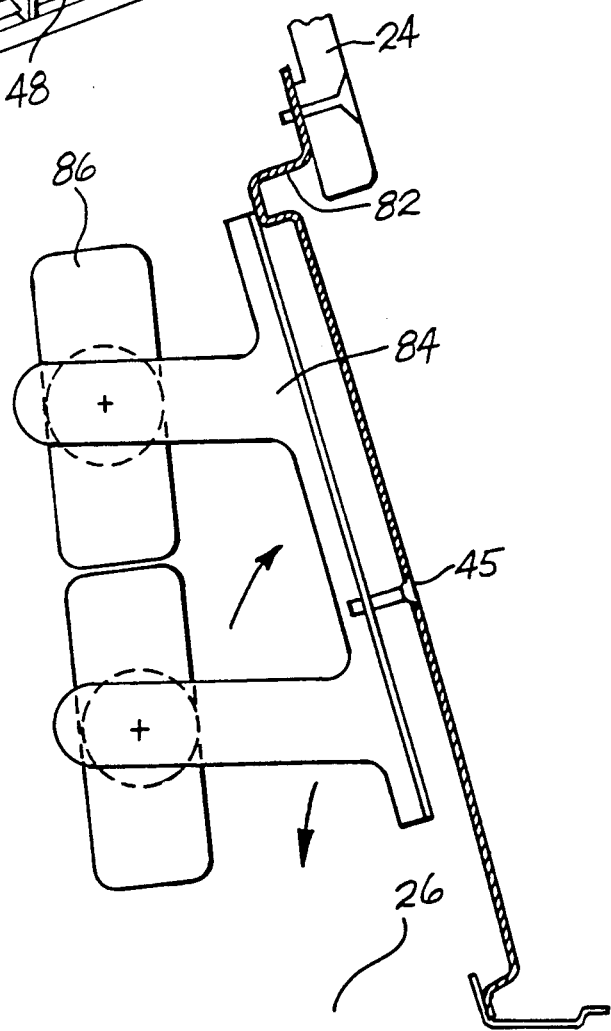
FIG. 2 is a side view of the first exemplary vent grille showing attachment of the vent grille to a portion of an aircraft.
Figure 3:
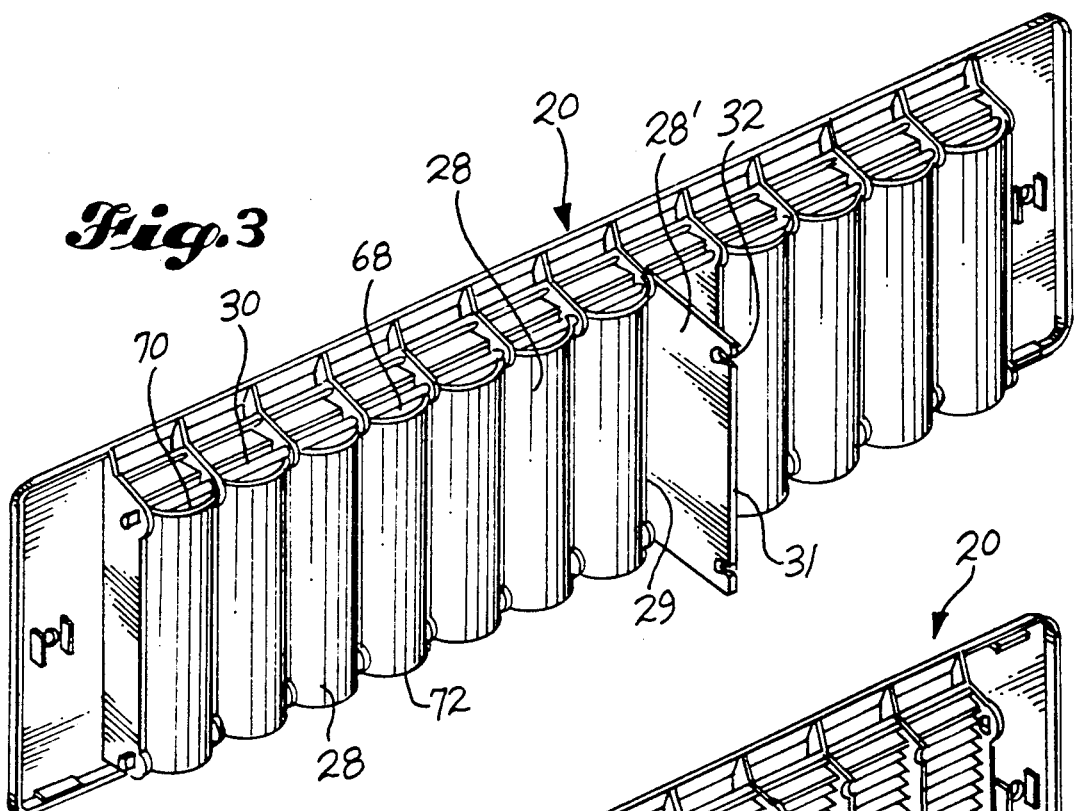
FIG. 3 is rear isometric view of the first exemplary vent grille.

Briefly, the present invention includes a vent grille indicated at 20 in FIG. 1 which includes a number of apertures 22. The grilles are placed over openings in the sidewalls 24 (FIG. 2) of the aircraft cabin. Each opening communicates via a conventional vent box 26 with the cargo compartment (not shown) located below the floor of the passenger cabin. In order to regulate the flow of air through the grille apertures 22 (FIG. 1), a number of resilient baffles 28 (FIG. 3) are connected to the back of the grille 20. As shown in FIG. 3, when the baffles 28 are in a closed position, the baffles are folded along their longitudinal axes in a manner that their cross-sections are semicircular. In the closed position the grille apertures 22 are not completely covered by the baffles. This permits a small amount of air to flow through the openings 22 in either direction for reasons to be discussed later.

In the present invention, the baffles are installed so that one vertical side edge 29 (FIGS. 3 and 5) of each baffle is fixedly connected to the grille by means, of upper and lower horizontal rods 30. An opposite vertical side edge 31 of each baffle includes a pair of open slots 32 which are inserted around the rods 30 when the baffles are folded into the closed position. In the event of a sudden decompression in the cargo compartment, the resulting pressure differential across the grille causes the slotted releasable side edge 31 of each baffle to be dislodged from the rods 30 and to relax and straighten in the shown by the baffle 28' in FIG. 3. This allows unrestricted air flow from the passenger cabin to the cargo compartment through the grille openings.

Having provided a brief introduction to the present invention, the grille vent 20 will be described in greater detail. Referring again to FIG. 1, the grille vent 20 includes an outer perimeter frame 40 having left, right flanged ends 42. The flanged ends 42 contain holes 44 which receive quarter turn fasteners 45 for mounting the panel to the cabin sidewall as shown in FIG. 2. Supported within the outer frame are a number of vertical ribs 46 (FIG. 1) which in turn support between them an number of horizontal louvers 48. The louvres 48 are rigidly attached between the vertical ribs such that they slant outward and downward toward the front of the frame. In addition, the vertical ribs 46 extend forward of the louvers so as to protect the louvers from damage due to accidental impact from passengers or equipment.

Figure 4:
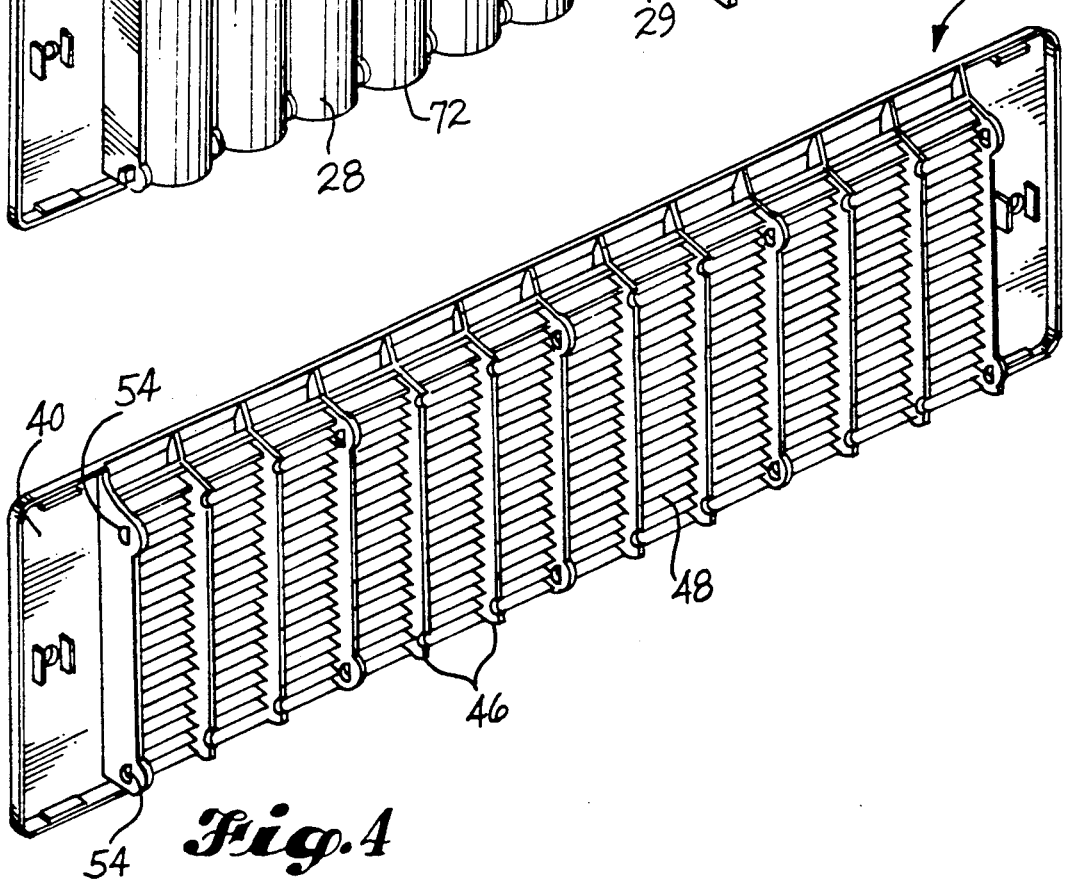
FIG. 4 is a rear isometric view of the exemplary vent grille in which baffles shown in FIG. 3 have been removed.

As shown more clearly in FIG. 4, the vertical ribs 46 extend in a rearward direction behind the frame 40 to support the upper and lower horizontal rods 30. In order to support the rods 30, every third rib 46 includes D-shaped upper, lower openings 54 for receiving the complementary shaped upper, lower rods 30 therein. The D-shaped cross sectional configuration of the rods 30 prevents their unwanted rotation in the openings 54.

Figure 5:
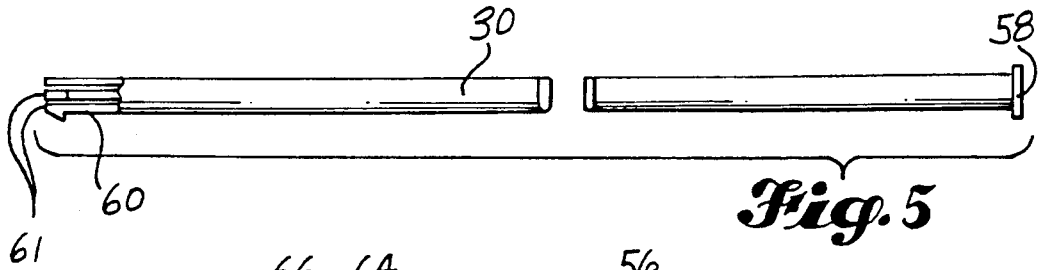
FIG. 5 is a plan view of a rod which is used to support the baffles on the grille.
Figure 6:
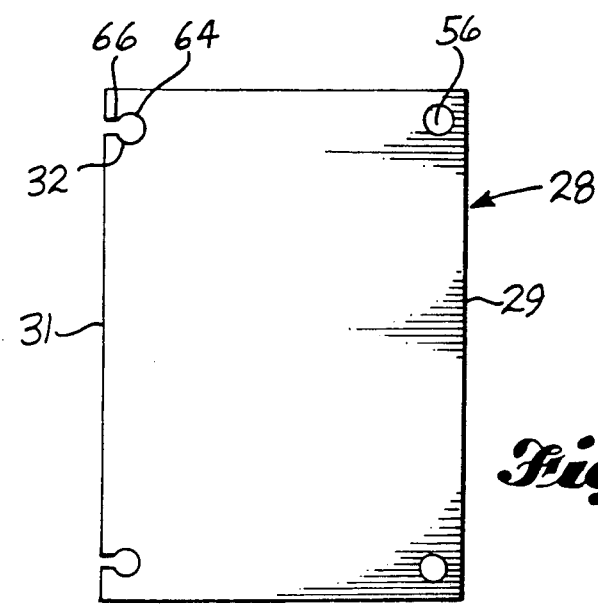
FIG. 6 is a plan view of a first exemplary baffle.

As shown in FIG. 5, each rod 30 includes a right flanged end 58 and a left shoulder end 60. In order to permit insertion of the shoulder end 60 through the openings 54, the shoulder end is tapered radially outward a short distance. Furthermore, the shoulder end is separated into several individual tangs 61 along a portion of the lengthwise axis of the rod. In this manner when the rod is inserted through each opening 54, the tangs are squeezed together to allow shoulder end of the rod to fit through the opening. However once the shoulder exits the opening on the endmost rib 46 and expands back to its original size, the rod is secured in place. The baffles 28 are attached by threading upper, lower openings 56 (FIG. 6) located near the vertical edge 29 of the baffles over the upper, lower rods 30 during their insertion through the ribs 46 of the grille.

In order to cover the grille apertures, the baffles 28 (FIG. 3) are folded into a semicircular configuration. More specifically, each slot 32 (FIG. 6) includes a circular portion 64 which communicates via a narrow channel portion 66 with the slotted edge 31 of the baffle. When the baffle is folded into the semicircular configuration to cover the grille apertures, the slots 32 are inserted around the rods 30 such that a middle portion 63 of the baffle is position farther from the louvers than the edges 29, 31. The resilient nature of the baffles causes their ends 29, 31 to engage the sides of the ribs 46 as shown in FIG. 3. In this manner, the baffles are held in place over the grille apertures under a sufficient preload to prevent unwanted opening or rattling of the baffles. The number of baffles installed on the grille may be varied depending upon the open area desired for the particular grille. In an exemplary embodiment the baffles are made of polyetherether ketone which is fatigue resistant, meets flammability requirements and which resiliently returns to its flat shape when dislodged from the rod 30 and from between the adjacent ribs 46.

In the event of a sudden loss of pressure in the cargo compartment ("normal" rapid decompression), the resulting pressure differential across the grille causes the slotted ends of the baffles to be dislodged from the rods and to be extended to the fully open position in a manner parallel to the airstream. Protection of the floor requires the apertures to be fully uncovered when a prescribed pressure differential across the grille is exceeded. On the other hand, if there is a sudden decompression in the passenger cabin (reverse rapid decompression), the baffles remain in their closed positions. In this case pressure equalization between the passenger cabin and the cargo compartment is accomplished via semicircular openings 68 (FIG. 3) which are formed at the top 70 and bottom 72 of each curved baffle. Due to the much smaller volume of the cargo compartment relative to the passenger compartment, these openings 68 are sufficiently large to achieve the required pressure equalization during reverse decompression without opening of the baffles. However, there is sufficient coverage of the grille apertures by the closed baffles during normal aircraft operation (no decompression) to allow the air conditioning system to operate properly.

The grille 20 is installed in the aircraft over existing openings 26 (FIG. 2) which communicate with the cargo compartment. Typically, the bottom of the grille engages the front of a conventional floor angle 80 and the top of the grille engages the front of a conventional carpet riser angle 82. The fasteners 45 are secured into convention supports 84 which are attached to the frame of the aircraft by conventional shock mounts 86.

Figure 7:
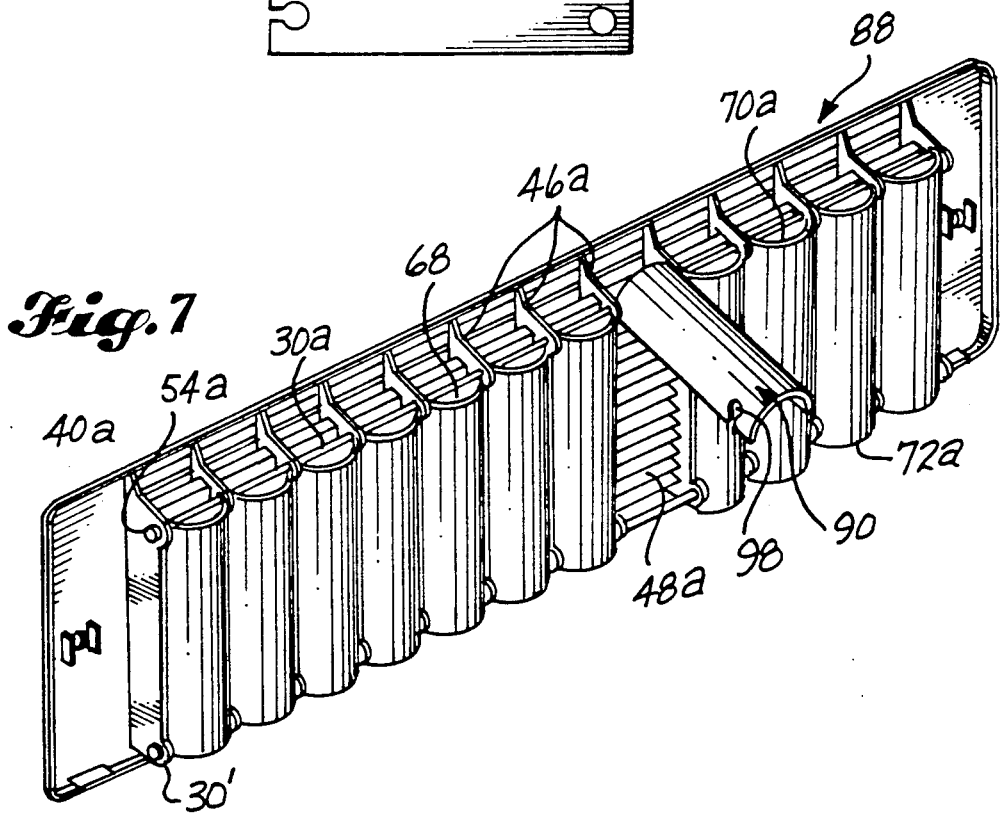
FIG. 7 is rear view of a second exemplary vent grille of the present invention.
Figure 8:
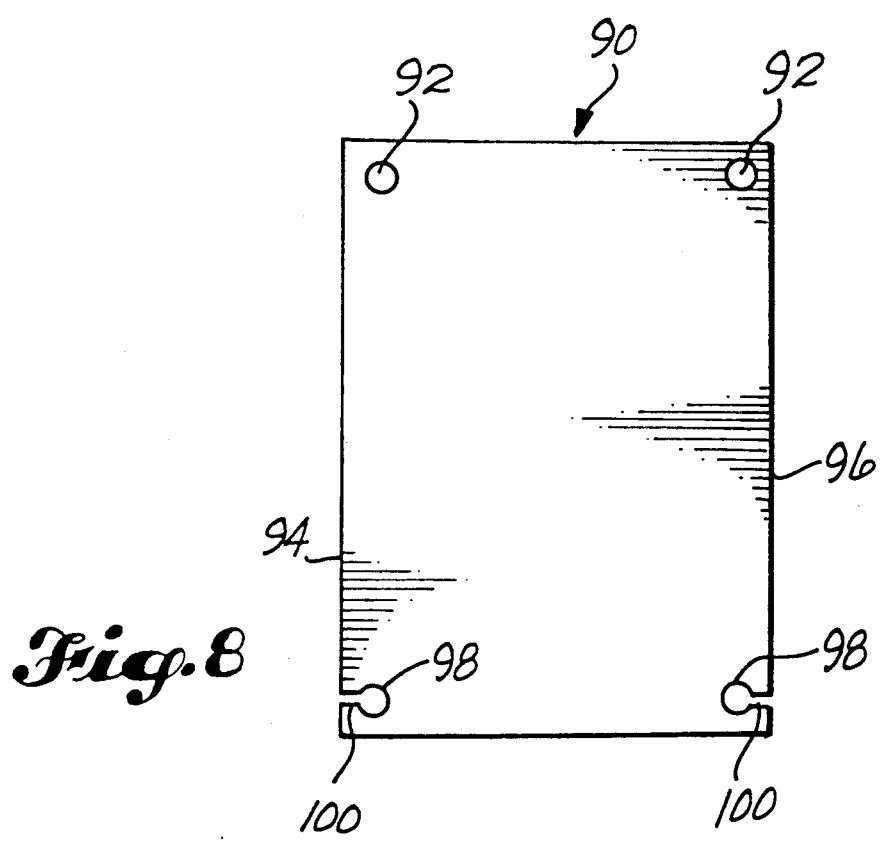
FIG. 8 is a plan view of a second exemplary baffle.

In another embodiment of the present invention shown in FIGS. 7 and 8, like elements shown in the previous embodiment are designated by like numerals with the suffix "a" attached. The present embodiment includes a vent grille 88 having rectangular, planar baffles 90 (FIG. 8) which include left, right upper holes 92 which are located at the left and right side edges 94, 96 of the baffle 90. In addition, the baffle includes lower left, right holes 98 which communicate with the left, right sides 94, 96 respectively of the baffle via respective channels 100. In the present embodiment, the upper part of the baffle 90 is connected to the upper rod 30a through the upper holes 92. However, in order to fit the baffle between adjacent ribs 46a of the vent grille 88, the baffle is curved along its longitudinal axis in a semicircular configuration as shown in FIG. 7 to form upper and lower openings 68a.

In order to cover the vent openings 48a, the lower part of the baffle 90 is attached to the lower rod 30a by sliding the lower openings 78 (FIG. 8) of the baffle over the lower rod 30a via the channels 100. In the present embodiment, the width of each channel 100 is less than the diameter of the rod 30a. In this manner the baffle is retained in the closed position covering the vent openings 48a until a rapid decompression in the cargo compartment whereupon the lower part of the baffle is dislodged from the lower rod 30a and the baffle is caused to swing about the upper rod 30a to a location approximately parallel to the airflow as shown in FIG. 7. This permits rapid flow of air through the vent panel into the cabin.

What is claimed is:

1. An air vent for an aircraft, the air vent comprising:
   a. a panel having at least one flow opening therein to permit air flow through the panel; and
   b. a covering member which is supported on the panel and which in response to a pressure differential across the air vent is caused to move between a closed position wherein the covering member in a curved configuration covers the flow opening and an open position wherein the covering member unfolds from the curved configuration into a planar configuration so as to uncover the flow opening.

2. The air vent as set forth in claim 1 wherein:
   a. The panel includes rib members;
   b. in the closed position the covering member is supported between the rib members in the curved configuration; and
   c. the pressure differential causes the covering member to be dislodged from between the rib members to unfold from the curved configuration.

3. The air vent as set forth in claim 2 wherein:
a. the covering member includes first and second edge portions and a middle portion which is located between the first and second edge portions; and
b. the first and second edge portions are located closer to the panel than the middle portion when the covering member is in the closed position.

4. The air vent as set forth in claim 3 wherein the first and second edge portions engage the rib members in the closed position.

5. The air vent as set forth in claim 3 wherein the first and second edge portions are located closer to the panel than the middle portion so as to form the curved configuration when the covering member is in the closed position.

6. The air vent as set forth in claim 1 wherein:
a. the covering member includes first and second edge portions and a middle portion which is located between the first and second edge portions; and
b. the first and second edge portions are located closer to the panel than the middle portion when the covering member is in the closed position such that the covering member has a curved configuration.

7. An air vent for an aircraft, the air vent comprising:
a. a panel having at least one flow opening therein to permit air flow through the panel from a first side of the panel to a second side of the panel; and
b. a covering member which is supported on the panel and which in response to a pressure differential across the air vent is caused to move between a closed position wherein the covering member covers the flow opening and an open position wherein the covering member is displaced from the closed position so as to uncover the flow opening, the covering member further including a first end portion which forms an end opening which permits airflow from the second side of the panel to the first side of the panel when the covering member is in the closed position.

8. An air vent for an aircraft, the air vent comprising:
a. a panel having at least one flow opening therein to permit air flow through the panel; and
b. a covering member which is supported on the panel and which includes first and second edge portions and a middle portion which is located between the first and second edge portions such that the first and second edge portions are located closer to the panel than the middle portion when the covering member is in the closed position such that the covering member has a curved configuration, the covering member, in response to a pressure differential across the air vent, moving between a closed position wherein the covering member covers the flow opening and an open position wherein the covering member is displaced from the closed position so as to uncover the flow opening, the covering member including a first end portion which is rotatably connected to the panel about a first axis and a second end portion which is releasably connected to the panel such that the pressure differential causes the covering member to be released from the panel at the second end portion and to rotate about the first axis to the open position.

9. The air vent as set forth in claim 8 wherein the first end portion forms an end opening in communication with the flow opening when the covering member is in the closed position so as to permit some airflow through the panel which is less than the airflow permitted when the covering member is in the open position.

* * * * *